United States Patent
Phillips et al.

(10) Patent No.: US 11,632,367 B2
(45) Date of Patent: Apr. 18, 2023

(54) SYSTEM AND METHOD FOR AGNOSTIC AUTHENTICATION OF A CLIENT DEVICE

(71) Applicant: Capital One Services, LLC, McLean, VA (US)

(72) Inventors: Jeremy Phillips, Brooklyn, NY (US); Joseph Goldstein, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 344 days.

(21) Appl. No.: 16/885,625

(22) Filed: May 28, 2020

(65) Prior Publication Data

US 2021/0377260 A1 Dec. 2, 2021

(51) Int. Cl.
 H04L 9/40 (2022.01)
(52) U.S. Cl.
 CPC .......... *H04L 63/0853* (2013.01); *H04L 63/20* (2013.01)
(58) Field of Classification Search
 CPC ............................ H04L 63/0853; H04L 63/20
 USPC ............................................................ 726/1
 See application file for complete search history.

(56) References Cited

U.S. PATENT DOCUMENTS

| | | | |
|---|---|---|---|
| 8,991,693 B2 | 3/2015 | Rowberry | |
| 9,189,778 B1 | 11/2015 | Sh. Al-Rashidi | |
| 9,563,895 B2 | 2/2017 | Bondesen et al. | |
| 9,710,804 B2 | 7/2017 | Zhou et al. | |
| 11,093,771 B1 * | 8/2021 | Genner | G06V 40/12 |
| 2011/0145152 A1 | 6/2011 | McCown | |
| 2011/0231315 A1 | 9/2011 | Bandyopadhyay et al. | |
| 2012/0173431 A1 | 7/2012 | Ritchie et al. | |
| 2012/0290376 A1 | 11/2012 | Dryer et al. | |
| 2014/0019358 A1 | 1/2014 | Priebatsch | |
| 2014/0129422 A1 | 5/2014 | Zhou et al. | |
| 2014/0297530 A1 | 10/2014 | Eckel et al. | |
| 2014/0372321 A1 | 12/2014 | Khan | |
| 2015/0066651 A1 | 3/2015 | Hu et al. | |
| 2015/0120472 A1 | 4/2015 | Aabye et al. | |
| 2015/0220933 A1 | 8/2015 | Li | |
| 2016/0012430 A1 | 1/2016 | Chandrasekaran et al. | |
| 2016/0321643 A1 | 11/2016 | Beck et al. | |
| 2016/0342991 A1 | 11/2016 | Narasimhan et al. | |
| 2017/0061428 A1 | 3/2017 | Prabhu et al. | |
| 2017/0061435 A1 | 3/2017 | Armes et al. | |
| 2017/0134429 A1 * | 5/2017 | Gustafsson | H04L 63/108 |
| 2017/0154324 A1 | 6/2017 | Singh et al. | |
| 2017/0178097 A1 | 6/2017 | Karnik et al. | |
| 2017/0186014 A1 | 6/2017 | Nowak et al. | |
| 2017/0228715 A1 | 8/2017 | Gurunathan | |
| 2018/0039973 A1 | 2/2018 | Bishop et al. | |

\* cited by examiner

*Primary Examiner* — Anthony D Brown
(74) *Attorney, Agent, or Firm* — Hunton Andrews Kurth LLP (57) ABSTRACT

A central entity can be in communication with a terminal and a plurality of authentication entities. The central entity can receive a token from the terminal and the central entity can decide to transmit the token to a subset of the plurality of authentication entities. The authentication entities which receive the token, can verify or authenticate the token and transmit an authentication message to the central entity. Based on the authentication messages, the central entity can transmit a message to the terminal indicating which authentication entities authenticated or verified the user and/or a request associated with the user.

20 Claims, 5 Drawing Sheets

SYSTEM AND METHOD FOR AGNOSTIC AUTHENTICATION OF A CLIENT DEVICE

BACKGROUND

Contactless cards have become very popular recently because these cards have simplified in-store and online transactions. At the same time, because of the popularity of these cards, hackers actively try to forge them to conduct unauthorized transactions. As a result, there has been a renewed focus on enhancing the security of contactless cards as well as their functionality.

SUMMARY

Generally, a contactless card can function as an authentication device for a specific purpose or system. With rapid advancements in technology, the cost of manufacturing contactless cards has declined drastically. As a result, many entities take advantage of the low cost of these cards to provide their users with contactless cards for authentication purposes. However, because each card can authenticate the user for a specific entity, a user may have to carry several contactless cards for authentication purposes and this can be very inconvenient for the user. Similarly, a client device (such as a cellphone or tablet) can function as an authentication device for some systems or entities. The client device can include a plurality of software applications, and each application can include a mechanism for transmitting a token or cryptogram to a server for authentication of the user. However, each entity can require a different security or authentication protocol, and as a result, each application is configured to authenticate the user only with respect to a specific system or entity. Thus, if a user demands authentication transactions with several different entities, the user will have to use a different application for each entity. Therefore, it is an object of this disclosure to provide a method and system which enables a user to authenticate the user with several different entities using only one contactless card or client device.

In one example embodiment, a central entity is provided. The central entity can be in communication with a terminal and a plurality of authentication entities. The central entity can receive a token from the terminal and the central entity can decide to transmit the token to a subset of the plurality of authentication entities (sometimes referred to as the "authentication entities"). The authentication entities which receive the token, can verify or authenticate the token and transmit an authentication message to the central entity. Based on the authentication messages, the central entity can transmit a message to the terminal indicating which authentication entities authenticated or verified the user and/or a request associated with the user.

In one example embodiment, the terminal is in communication with a client device, and as a result of an interaction between the terminal and the client device, a token can be generated. The terminal (or the client device) can transmit the token to the central entity and the central entity can transmit the token to the subset of the plurality of authentication entities. In another example embodiment, the terminal is a client device, which can generate the token. The client device can transmit the token to the central entity for transmission to the authentication entities.

In one example embodiment, an interaction between the client device and the terminal creates a first token. The token can correspond to an identification number for the user and an identification number for the terminal. The terminal can transmit the first token to the central entity which can transmit the first token to the authentication entities. In another example, once the central entity receives the first token, the central entity can generate a second token based on the first token and the central entity can transmit the second token to the authentication entities. In yet another example embodiment, the central entity can generate a plurality of tokens based on the first token. The central entity can transmit one of the plurality of tokens to each of the authentication entities.

In one example embodiment, the token can include instructions for sending the token to the authentication entities and the central entity can generate the second token or the plurality of tokens based on the instructions. In another example embodiment, the central entity can generate the second token or the plurality of tokens based on a set of rules or preferences specified by the user. In yet another example embodiment, the central entity can include a predictive model for determining how the second token or the plurality of tokens should be generated. The predictive model can be trained based on, e.g., past transactions.

In one example embodiment, a token can be encrypted to secure the data in transit. For example, an end-to-end encryption scheme can be implemented. Each of the transmitting device (e.g., client device or terminal) and receiving device (e.g., central entity or authentication entities) can include an encryption key and an encryption algorithm. Using the encryption key and the encryption algorithm, the transmitting device and the receiving device can implement an end-to-end encryption scheme. In other words, the transmitting device can generate a cryptogram using the key and the encryption algorithm and transmit the cryptogram to the receiving device. The receiving device can decrypt the cryptogram using the key and the encryption algorithm.

In one example embodiment, a user can log in an account on a client device. The account can provide the user with the ability to interact with third-party service providers, e.g., databases, applications, websites, etc. However, each one of these third-party service providers can require an authentication step for the user through a designated contactless card. In one embodiment, the user can scan the designated contactless card at the client device. The client device can create a token identifying the user and the client device. Subsequently, the client device can transmit the token to a central entity, which can transmit the token to the third-party service providers for authentication. The central entity can determine which third parties to contact based on a determination by a predictive model stored on the central entity. For example, the predictive model can exploit past usage data, e.g., daily usage for the past year, and the model can make a prediction as to which third-party service providers to contact, e.g., if the user used a particular database only on Mondays, the model can recommend authentication with the database provider if the user logs in on a Monday. The central entity can contact a set of third-party service providers determined by the prediction model. Each third-party service provider can evaluate the token and determine whether to authenticate the token. If the third-party service provider authenticates the token, the third-party service provider can transmit a success message to the central entity. Otherwise, the third party service provider can transmit a failure message to the central entity.

In one example embodiment, a user owns multiple bank accounts with several different financial institutions, e.g., a first credit card account with a first institution and a second credit card account with a second institution. The user can operate a client device which can authenticate the user and facilitate a transaction using a plurality of the accounts. For example, the client device can facilitate a purchase transaction and pay for the purchase using funds available in both the first credit card account and the second credit card account. In one embodiment, the first credit card offers an advantageous rewards program for a first category of products and the second credit card offers an advantageous rewards program for a second category of products. In this example, the user can scan the client device at a terminal of a merchant to purchase a product in the first category and a product in the second category. An interaction between the client device and the terminal can create a token. The token can provide information about the user, the merchant and the products.

The terminal can pass the token to a server (e.g., central entity), which is in communication with the first institution and the second institution. The server can pass the token to each of the first institution and second institution and ask each institution to process a transaction. The server can also specify a payment amount with each token that is being passed to the first institution and second institution, e.g., the first account of the first institution to pay for 10% of the purchase (i.e., the product in the first category) and the second account of the second institution to pay for 90% of the purchase (i.e., the product in the second category). Each of the first institution and the second institution can authenticate the token and/or the transaction assigned to that institution. Each of the first institution and the second institution can also determine whether there is enough money in the user's account to pay for the purchase. Each of the first institution and the second institution can transmit a message to the server and indicate whether the institution can process a payment as requested by the server. The server can transmit a communication to the terminal to indicate whether the payment can be processed.

In one embodiment, if one of the authentication entities refuses to authenticate the token, the central entity can submit a follow up request or token to a new set of the entities to determine a second best option for the user. For example, the central entity can split a transaction into three parts, and submits each part to one authentication entity. One of the authentication entities can reject the transaction proposed by the central entity, e.g., there is insufficient fund in the account. In response, the central entity can reorganize the transaction and contact a new set of authentication entities. For example, the central entity can split the transaction into four parts and contact the two original entities and two new entities.

DETAILED DESCRIPTION

Figure 1:
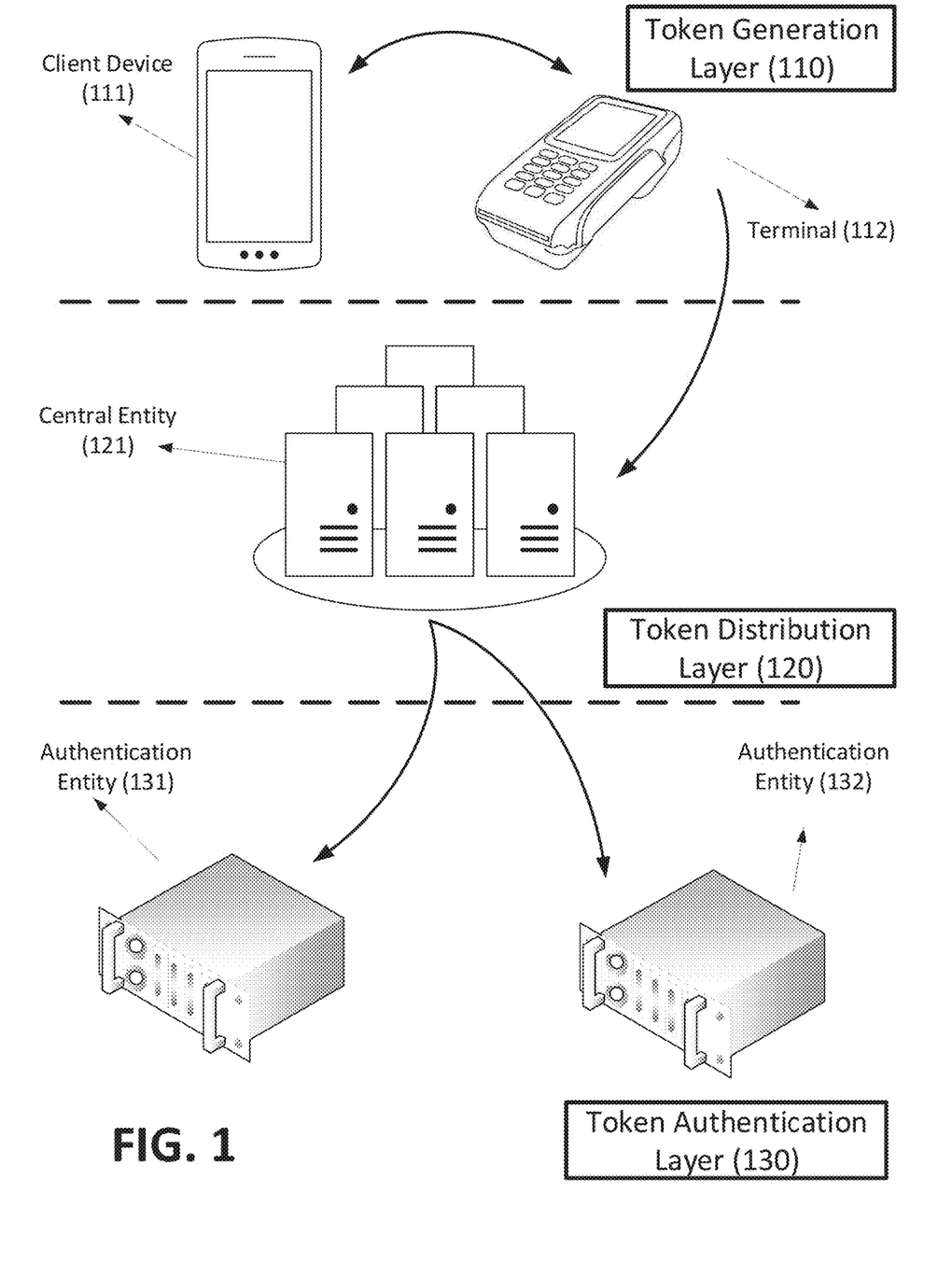
FIG. 1 shows an example agnostic authentication system.

FIG. 1 shows an example agnostic authentication system 100. The agnostic authentication system 100 can include a token generation layer 110, a token distribution layer 120 and a token authentication layer 130. In the token generation layer 110, a client device 111 can connect with a terminal 112 to generate a token. The client device 111 can include a biometric reader and an NFC, Bluetooth or beacon enabled chip, and the terminal 112 can receive a customer password or pin number. A syncing or pairing of the client device 111 and the terminal 112 can generate the token.

The token distribution layer 120 can receive the token from the token generation layer 110 and transmit the token to the token authentication layer 130, which can include a plurality of authentication entities 131 and 132. The token distribution layer 120 can connect to the token authentication layer 130 through an API based connection. The token distribution layer 120 can include intelligence for determining which authentication entities 131 and 132 to contact, and whether to modify or change the token before contacting each authentication entity. The user can define various rules and preferences for the token distribution layer 120. Additionally, the token distribution layer 120 can use predictive models to determine which authentication entities 131 and 132 to contact. Each authentication entity can verify the token it receives from the token distribution layer 120. For example, an authentication entity can verify that a token belongs to a valid user of the authentication entity. Subsequently, the authentication entity can transmit a message to the token distribution layer 120, and the token distribution layer 120 can relay the message to the token generation layer 110.

In the context of financial transactions, a user can use a contactless card for a payment. Typically, the payment is processed by one financial institution, i.e., the payment is funded by the money available in one account of one financial institution. The user decides which financial institution to process the payment when the user selects a contactless card at the time of the transaction. However, there can be benefits in allowing payment transactions to be processed through several different accounts held with different institutions. For example, certain accounts offer reward that are more advantageous for certain categories of purchases, or certain accounts can offer lower fee structures.

In one example embodiment, a central entity can receive a token from a user to process a payment for a transaction. The central entity can make a determination as to which banks should receive the token to process the payment. The user can specify the user's preferences to the central entity. For example, the user can set up a set of rules for processing transactions. Additionally, the central entity can use predictive models to make the determination. In one embodiment, prior to initiating a purchase transaction, the user can define the user's relationships with banks. Using the defined relationships as well as the user's preferences, the central entity can determine which banks to contact to process the payment (and how much money is withdrawn from each account). In one embodiment, once each bank receives a token from the user, the bank can determine whether the user has an account with the bank, and if the user has an account with the bank, the bank can determine whether the user has enough money in the account to pay for the transaction (or the part of the transaction assigned to the bank).

In one embodiment, a user can tap the user's phone on a merchant terminal. The phone can sync up with the terminal. The terminal and phone can generate a token which represents the transaction to be processed. The token can have enough information for authenticating the user and processing the payment. For example, the token can include information about the user, the user's phone, the transaction (e.g., the price), the merchant code, etc. The terminal can pass the token to the central entity, which can in turn pass the token to the banks. Upon receipt, each bank can determine whether the user has an account with the bank and whether there is enough funds available to process the transaction.

In one example, the central entity can structure the payment in a way that is the most advantageous to the user. For example, if one credit card carries rewards for groceries and one card carries rewards for tools, the central entity can ask the first credit card to pay for the groceries and the second credit card to pay for the tools.

There can be various techniques for determining which banks or entities to contact for processing the transaction. In one example embodiment, a user at the time of the transaction can specify which entities to be contacted. For example, the user can specify this on the terminal or the client device at the time of the transaction. The terminal or the client device can include a user interface, which is configured to receive a user input indicating which entity or bank pays for each part of the transaction. In this example, the token can include this information (i.e., the user input), and thus, the based on this information, the central entity can make the determination as to which banks or entities to contact.

In another example embodiment, the user can specify a set of rules for making the determination as to which banks or entities to contact. The rules can be set before the user requests the transaction. For example, the user can specify an account to be prioritized or an account not to be used prior to asking the terminal to process a transaction. Using the rules that the user set up, the central entity can rank the accounts for each transaction, e.g., the accounts that maximize the user's points or minimize the fees are ranked higher. The central entity can determine which banks to contact, e.g., based on the ranking of the accounts. For example, the central entity can contact the top three ranked accounts.

In yet another example embodiment, the central entity can store and execute an optimization model which uses machine leaning algorithms for making the determination as to which banks or entities to contact. The optimization model can be trained by, e.g., past payments data pertaining to the user or other users of the system. Past payments data can include data points such as transaction amount, merchant identification code, purchase items, item codes, accounts used to pay for each purchase, or other similar data points that can be collected at the time of a transaction. By analyzing past payments data, the model can determine the types of accounts that are used, e.g., at specific merchants or for specific purchases. The optimization model can extrapolate recommendations based on the payments data. For example, if most of the users of the system use a particular credit card at a merchant, the optimization model can recommend the same credit card to the user when the user shops at the merchant. Similarly, if a user always uses a combination of credit cards for a particular purchase, the optimization model can recommend the same combination of credit cards for the same purchase.

Tokenization can be the process of substituting a sensitive data element with a non-sensitive equivalent, referred to as a token. The token does not have any extrinsic or exploitable meaning or value. The token can be a reference (i.e. identifier) that maps back to the sensitive data through a tokenization system. The mapping from original data to a token uses methods which render tokens infeasible to reverse in the absence of the tokenization system. For example, tokens created from random numbers can be infeasible to reverse. The tokenization system provides data processing applications with the authority and interfaces to request tokens, or detokenize back to sensitive data.

When tokens replace live data in systems, the result is minimized exposure of sensitive data to unauthorized applications and processes. This can reduce the risk of compromise or accidental exposure of the sensitive data. Usually, applications can operate using tokens instead of live data, with the exception of a small number of trusted applications explicitly permitted to detokenize when strictly necessary. Tokenization systems can be operated in-house within a secure isolated segment of the data center, or as a service from a secure service provider.

Tokenization may be used to safeguard sensitive data involving, for example, personally identifiable information, bank accounts, financial statements, medical records, criminal records, driver's licenses, loan applications, stock trades, voter registrations, etc. Tokenization can be used in credit card processing. For example, the primary account number (PAN) can be replaced with a surrogate value called a token. De-tokenization can be the reverse process of redeeming a token for its associated PAN value.

In one example embodiment, a token can be single-use or multi-use; cryptographic or non-cryptographic; reversible or irreversible; authenticable or non-authenticable; and/or various combinations thereof. For example, for credit card transactions, a single-use token can be used in a single transaction. After having been used one time (i.e., in a single transaction), the single-use token becomes void. Single-use tokens keep the tokenized data secure but at the same time make it problematic to process recurring transactions, refunds and returns processing. Multi-use tokens can be used multiple times. These repeatable and simplified transactions stay associated with the tokenized data for life. A reversible token allows a user to reverse the token, retrieving original information. Being able to extract the original information can prove useful for certain applications, but leaves the token vulnerable to certain attacks.

In one example embodiment, a token can represent information about the client device, the user of the client device, a terminal, a transaction, items included in the transaction (and/or a category code for each item included), a category identification number for the merchant operating the terminal, a transaction amount, instructions for the central entity, etc. For example, the token can include information unique to the client device, and using the token, the central entity or the authentication entities can identify the user of the client device (because, in one example, each client device is associated with only one user).

In one example embodiment, the client device can generate a token using a token generation algorithm, e.g., Turing. In another example embodiment, prior to initiating a transaction at a terminal using the client device, the client device can be in communication with a token vault and receive a token representing the client device (and/or other information). The token vault can be a third party token generation service. In yet another example embodiment, the client device can transmit certain information to the terminal and the terminal can generate the token. For example, the terminal can generate the token using a token generation algorithm. The terminal can also generate the token by communicating with a token vault. For example, the terminal can transmit certain information to the token vault and the token vault can generate a token for the transmitted information. The token vault can then transmit the token to the terminal. In yet another example embodiment, the terminal can provide certain information to the client device and the client device can generate a token. The client device can then pass the token to the terminal. For example, the client device can generate the token using a token generation algorithm or a token vault.

In one example embodiment, the token can be encrypted. In this example, the encrypted token can be transmitted from a transmitting device to a receiving device. Each of the transmitting device and the receiving device can include a key and an encryption algorithm. The transmitting device can encrypt the token using the key and the encryption algorithm (e.g., to generate a cryptogram). Once the receiving device receives the encrypted token (or the cryptogram), the receiving device can decrypt the encrypted token using the key and the encryption algorithm. For example, the transmitting device can be a contactless card and the receiving device can be an authentication entity. When a user taps the user's contactless card at a terminal, the terminal can power up the contactless card and communicate with the card using the NFC technology. The contactless card can encrypt a token using a master key and an encryption algorithm (e.g., AES or 3DES). The contactless card can also transmit the encrypted token to the terminal and the terminal can transmit the encrypted token to the central entity. The central entity can decrypt the token using the key and the encryption algorithm. Once decrypted, the central entity can analyze the token to determine which authentication entities should receive the token.

Although in some example embodiments of this disclosure the terminal can transmit the token to the central entity, in some other embodiments, the client device can transmit the token to the central entity. In some embodiments, there is not terminal, and instead the client device can both generate the token and transmit the token to the central entity.

In one example embodiment, a user can provide input regarding the universe of authentication entities with which the user has relationships. The central entity can store the user's input and consider contacting these authentication entities (or a subset thereof) when a token is received from a client device. For example, using a client device, the user can provide a list of all the third-parties that should be contacted when the user logs into the client device. As another example, the user can provide a list all the banks that the user has an account with. The central entity can contact some or all of these banks to process a transaction.

In one example embodiment, the central entity can determine which authentication entities to contact and whether to modify or change the token before sending the token to each authentication entity. These determinations can be based on instructions provided with the token, rules defined by the user and predictions made by a machine learning model.

In one example embodiment, the token can include information about the entities that the central entity is required to contact. For example, during a purchase transaction, a user can specify on a user interface of a client device or terminal the names of the banks that should be contacted to process the transaction. When the central entity receives the token, the central entity can obtain the information included in the token (or with the token) and contact the banks accordingly.

In one example embodiment, the user can define a set of rules for the central entity to determine which authentication entities to contact when a token is received at the central entity. In defining the rules, the user can specify a set of conditions and a set of actions to be taken when the conditions are satisfied. In one example, the user can define the rules on the client device and the client device can transmit the rules to the central entity when the token is transmitted to the central entity. In another example, the user can store the rules on the central entity so that each time the central entity receives a token, the central entity can refer to the rules and determine which entities to contact.

For example, the user can define a rule that takes into account the time of day when the token is generated. In the example of the user logging into third-party services, the user can specify, e.g., a first group of services to be contacted if the token is generated in the morning and a second group of service to be contacted if the token is generated in the afternoon. As another example, the user can create rules which can set a limit for an account in a purchase transaction. For example, the user can specify a maximum expenditure of $1,000 for a specific account. When the central entity receives a token, the central entity can allocate the payment to each account up to the maximum allowable limit. As yet another example, the user can set rules for purchase categories. For example, the user can specify that certain purchase categories, e.g., groceries, can be paid with a specific account, e.g., a credit card which offers rewards for this category of purchases. As yet another example, the user can set rules for card fees relating to purchase transactions. For example, the user can set a rule which prioritizes the card that offers the lowest fee for a specific category of purchases, e.g., the rule can specify that the central entity should use a particular credit card for groceries because the credit card offers interest free financing for grocery purchases for one year. As yet another example, the user can set a rule which blocks an account. For example, if the user suspects that the limit might for a credit card account be reached during a period of time, the user can block the account so that the central entity would not add to the account balance during the period. As yet another example, the user can set a rule which can require splitting the transactions among a plurality of cards according to a predetermined ratio. For example, the central entity can split a transaction between two cards such that the first card pay 40% of the balance and the second card pays 60% of the balance. As yet another example, the user can set a rule which can require splitting the transactions among a plurality of cards based on the funds available to each account.

In one example embodiment, the central entity can use a predictive model to determine which authentication entities to contact. In this embodiment, the central entity can train the predictive model using labeled data from past transactions. The central entity can gather past transaction data generated by the user and other users and create a labeled dataset to train the model. Using the labeled dataset, the central entity can use an unsupervised learning technique, supervised learning technique, a deep learning technique, or artificial neural networks to train the model.

For example, the central entity can use past transactions data for all users and discover that for groceries, the users prefer using a first credit card and for gas, the users prefer using a second credit card. Thus, when a user makes a grocery purchase, the central entity sends the token to the first credit card entity and when the user makes a gas purchase, the central entity sends the token to the second credit card entity. If a transaction includes both groceries and gas, the central entity can split the transaction. For example, the central entity can charge the groceries to the first credit card and the gas to the second credit card.

As another example, a model can be trained to determine recurring expenses and recurring deposits in an account, e.g., by evaluating past transactions in the account, including the transaction amounts and the transaction titles. The model can also determine a disposable income for the account, e.g., by deducting recurring expenses from recurring deposits.

When a new transaction is initiated, the central entity can determine whether the transaction is a recurring expense for a specific account. If the transaction is a recurring expense for a specific account, the transaction can be paid for by the funds available in the specified account. Otherwise, the central entity can withdraw funds from one or more of the accounts most suitable for the withdrawal (e.g., the accounts which offers the most advantageous rewards programs or lowest fees based on the category of purchase). The central entity can limit the amount of the withdrawal for each account up to the disposable income determined for that account. By limiting the withdrawal to the disposable income in each account, the user can avoid overdraft fees.

In one example embodiment, the central entity can determine whether the token needs to be changed or modified before sending the token to the authentication entities. Each authentication entity can specify a communication protocol for the central entity. For example, some authentication entities can require personal information or account numbers in the token but others might be able to process transactions based on only client device identification numbers. After the central entity determines which authentication entities to contact, the central entity can review the communication protocol for each authentication entity. If the token received from the terminal (or client device) meets the requirements for the communication protocol for each authentication entity determined to be contacted, the central entity can transmit the token to the authentication entity. Otherwise, the central entity can change or modify the token to meet the requirements for the communication protocol. For example, in one embodiment, the client device provides a token which only includes an identification number for the client device. However, one of the authentication entities requires the token to include a user identification number. The central entity can contact a token vault and obtain a new token to be transmitted to the authentication entity. Subsequently, the central entity can transmit the new token to the authentication entity (instead of the original token received from the terminal).

In one example embodiment, a first token received from a terminal can include a transaction amount, a list of items purchased, and a price for each item. The central entity can determine how to divide up the transaction such that the user obtains maximum points for the transaction. For example, the central entity can divide up the transaction into two transactions, the first transaction including a first class of items and the second transaction including a second class of items. The central entity can obtain a token for the first transaction and a second token for the second transaction. The central entity can submit the token for each transaction to the respective account (or authentication entity) for processing and approval.

In one example embodiment, a communication protocol for a specific authentication entity can require a specific encryption scheme. The central entity can encrypt a token received from the terminal as required by the communication protocol. Subsequently, the central entity can transmit the encrypted token to the authentication entity. In another example embodiment, the central entity can receive a first token. If one of the authentication entities requires certain information in the token that is not included in the first token and the specific encryption protocol, the central entity can generate a second token which meets the information requirement. Also, the central entity can encrypt the second token according to the specific encryption protocol, as required by the authentication entity.

In one example embodiment, the central entity can transmit the token to a plurality of authentication entities. Each authentication entity can process the token and respond to the central entity. For example, each authentication entity can detokenize the token and obtain the information masked by the token. Using the detokenized information, the authentication entity can determine whether the token or the user can be authenticated. For example, if a token includes a device identification number, the authentication entity can determine whether an account is associated with the device identification number. If so, the authentication entity can authenticate the token and transmit an authentication message to the central entity. If the authentication entity is unable to find an account in association with the device identification number, the authentication entity can transmit a message to the central entity indicating that the token cannot be verified.

In one example embodiment, the token can include a client device identification number and a transaction amount. An authentication entity receiving the token can detokenize the token and determine whether there is an account associated with the client device identification number. The authentication entity can also determine if there is enough money in the account to fund the transaction (for the specified transaction amount). If there is an account associated with the client device identification number and the account has sufficient funds for processing the transaction, the authentication entity can transmit an authentication message to the central entity.

In one example embodiment, the central entity can receive a message from each authentication entity that received a token from the central entity. The authentication entity can generate the message in response to receiving the token from the central entity. The message can indicate that, e.g., the token is authenticated, the token is not authenticated, the transaction is approved, or the transaction is rejected. In one example embodiment, the message can describe a reason for lack of authentication of the token or rejection of the transaction. For example, the message can describe that the transaction was rejected because there is not enough money in the account.

In response to receiving the message at the central entity, the central entity can transmit a message to the terminal (or client device). The central entity can also submit a follow up request or token to a new set of authentication entities. For example, if all of the authentication entities that received the token transmitted approval messages to the central entity, the central entity can transmit a message to the terminal indicating that the transaction is approved. The central entity can also transmit a message indicating which accounts are going to fund the transaction and how much each account is going to pay to fund the transaction.

As another example, if only some of the authentication entities that received the token transmitted approval messages to the central entity, the central entity can transmit a message to the terminal indicating which authentication entities approved the transaction. In one embodiment, after receiving at least one rejection message from one of the authentication entities, the central entity can submit a follow up request. For example, if the initial token was submitted to authentication entities holding accounts A, B, C, and D, and the authentication entity holding account D rejects the transaction, the central entity can determine an alternative advantageous combination of accounts to fund the transaction. For example, now the central entity can submit a new token to the authentication entities A, B and E to fund the transaction. In this example, the initial combination of accounts, i.e., A, B, C and D is different from the follow up combination, i.e., A, B and E. In each instance, the central entity can seek to maximize the user's rewards or minimize the transaction fees that the user incurs.

As another example, if only some of the authentication entities that received the token transmitted approval messages to the central entity or if all the authentication entities rejected the transaction, the central entity can transmit a rejection message to the terminal.

In one example embodiment, the terminal can display the message received from the central entity. The terminal can also transmit the message to the client device, which can display the message to the user.

In one example embodiment, if at least one of the authentication entities that received the original token rejects the transaction, the central entity can transmit a message to the terminal to display a prompt. For example, the prompt can ask the user if the user desires a specific combination of the accounts to fund the transaction. The user can enter the user's preference using a keypad of the terminal and the terminal can transmit the preference to the central entity. The central entity can generate a follow up token based on the user's preference. As another example, after receiving the message from the central entity, the terminal can transmit a communication to the client device and the client device can display the prompt. The user can provide an input in a user interface of the client device, and the client device can transmit the user's input to the terminal, which can relay it to the central entity. The central entity can generate the follow up token based on the input.

In an example embodiment, a user can implement the authentication technique disclosed herein using a client device or a contactless card.

In an example embodiment, a client device can be a mobile device, a cell phone, a smartphone, a laptop, a desktop, a notebook, a tablet, or a wearable device. The client device can include a processor, a memory, and a transceiver. The client device is configured to store and execute software program capable of communication with a terminal, e.g., using a communication protocol such as NFC. The client device can also interact with a terminal to create a token. The client device can store one or more encryption keys and encryption algorithms. Using the one or more keys or algorithms, the client device can encrypt communication with the terminal.

In one example embodiment, the client device can store information such as a user's name, identification number, account number, credit card information, etc. The client device can use this information to generate a token. The token can facilitate a transaction with various authentication entities. In one example embodiment, the client device can store a digital wallet. The digital wallet can store a user's credentials, e.g., name, address, phone number, age, identification number, etc. The credentials can be passed to a terminal using a wireless protocol, e.g., near field communication (NFC). The digital wallet can be used for financial transactions and authentication.

A contactless card can include processing circuitry for storing and processing information. The processing circuitry can include processors, memories, error and parity/CRC checkers, data encoders, anticollision algorithms, controllers, command decoders, security primitives and tamper-proofing hardware.

In an example embodiment, the contactless card can be a JavaCard which can include one or more applets. The applets can be firewalled, and data can be allocated to the applet for storage. The data can be stored transactionally in an EEPROM flash memory, e.g., if the write isn't complete when the power is removed, the contents remain the same as before.

A contactless card can wirelessly communicate with a terminal. For example, a contactless card can be a credit card including a magnetic tape or a radio-frequency identification ("RFID") tag. Some contactless cards can include both the magnetic tape and the RFID tag.

A terminal can communicate with a contactless card if the contactless card is held in proximity to the terminal. The terminal can read the contactless card over a short distance using near-field communication ("NFC") technology, which uses radio frequency induction. A contactless card can include an inductor to capture some of the incident radio-frequency interrogation signals transmitted by the terminal, rectify it, and use it to power the card's processing circuitry. As such, contactless cards can function without an internal power source. However, in some embodiments, contactless cards can include an internal power source.

The contactless card can be EMV-compliant. Europay, MasterCard and Visa ("EMV") is a payment method based upon a technical standard for smart payment cards. EMV cards can store their data on integrated circuits in addition to magnetic stripes.

In an example embodiment, the contactless card is provided with a radio-frequency identification ("RFID") tag. In some embodiments, the RFID tag can include processing circuitry for storing and processing information that modulates and demodulates a radio-frequency signal (usually received from a terminal, reader/writer or scanner). An RFID tag can also include an antenna for receiving and transmitting the signal. Additionally, an RFID tag can include a power source or means for collecting DC power from the incident terminal signal. These means can include modulators, voltage regulators, resets, and connections to an antenna. The antenna can be an electric dipole antenna or a coil antenna.

In an example embodiment, the coil of a contactless card can act as the secondary of an air core transformer. The terminal can communicate with the contactless card by cutting power or amplitude modulation. The contactless card can infer the data transmitted from the terminal using the gaps in the contactless card's power connection, which is functionally maintained through capacitors. The contactless card can communicate back by switching a load on the contactless card's coil or load modulation. Load modulation can be detected in the terminal's coil through interference.

In an example embodiment, a terminal can communicate with a client device (or a contactless card) and a server. For example, the terminal can receive information from or transmit information to the client device. The terminal and the client device can communicate using a wireless protocol, e.g., NFC. The terminal can include a processor, a memory, a transceiver and at least one antenna. The processor of the terminal can decode data received from the client device. Also, the terminal can pass information from the client device to the server and vice versa (i.e., from the server to the client device). The terminal (or the client device, or both) can create a token as a result of an interaction with a client device. The token can include information about an authentication transaction. The terminal can transmit the token to the server for further analysis.

A terminal can conduct a two-way communication with a client device, e.g., as described in ISO 14443. The two-way communication can be digitally encoded. Using a two-way communication, the terminal can update, delete or modify the information stored on the client device. There can be several frequency ranges, and several proprietary formats for the two-way communication (e.g., HID in the 125 Mhz range). The 13.56 Mhz frequency range (NFC) is dominated by ISO 14443 compatible cards.

A terminal and a contactless card can exchange messages, which can include commands or data. For example, a terminal can send a command message to the contactless card, the contactless card can process the command message in its processor and the contactless card can send back a response message to the terminal. Each of the command message and the response message can include data. A message can include TLV (Type, Length and Value) data and a command such as STORE_DATA command which prompts storage of the data included in the message in the contactless card.

Figure 2:
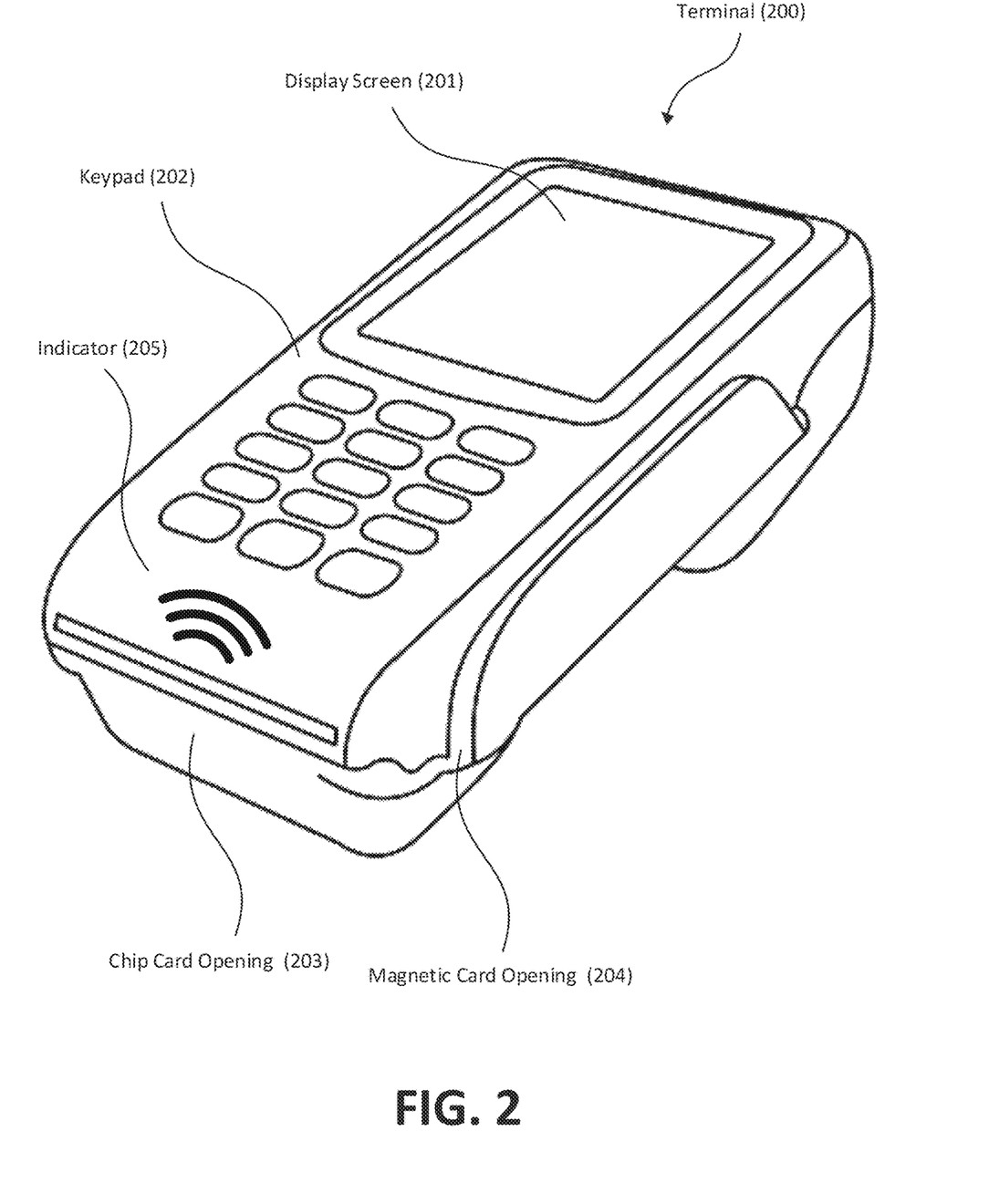
FIG. 2 illustrates a terminal according to an example embodiment.

FIG. 2 illustrates a terminal 200 according to an example embodiment. In this example embodiment, the terminal 200 can include a display screen 201. This display screen can be any type of display screen, e.g., an LCD display screen. The terminal 200 can also include a keypad 202. Using the keypad 202, a customer can enter information into the terminal 200. The terminal 200 can also include an opening 203 for inserting a chip card into the terminal 200. Using the opening 203, a customer can insert a chip card into the terminal 200 so that the pins of the terminal 200 can electrically connect with the contact pad of the chip card. In some embodiments, the terminal 200 can include a magnetic card opening 204. Using the magnetic card opening 204, the customer can swipe the contactless card at the terminal 200 and the terminal 200 can obtain any information stored on the magnetic tape of the contactless card.

In an example embodiment, the terminal 200 can be a contactless terminal, which can include antennas for sending and receiving signals, a transceiver, and a processor to decode data. In a passive system, the terminal can transmit an energy field that can wake up the tag and power its chip, enabling it to transmit or store data. In turn, the tag converts the radio signal into usable power, and responds to the terminal in the form of a radio signal. The signal can include the tag's identity and other information. Once the terminal receives the response, the terminal converts the response and extracts any information included in the radio signal. The information collected from the tag is then transferred through a communications interface to a host computer system, where the data can be stored in a database or analyzed by the computer system. The terminal can also update, delete or modify the information stored on the contactless card.

In the example embodiment of FIG. 2, the terminal 200 is provided with one or more antennas (not displayed), which enable the device to read information from a contactless card and write information on the contactless card. The terminal 200 can include an indicator 205, which shows that the device can be contactless.

In this disclosure, the terms reader/writer, scanner, terminal and client device have been used interchangeably, and they all refer to a device which can scan a contactless card or client device and/or write information on the contactless card or client device.

Figure 3:
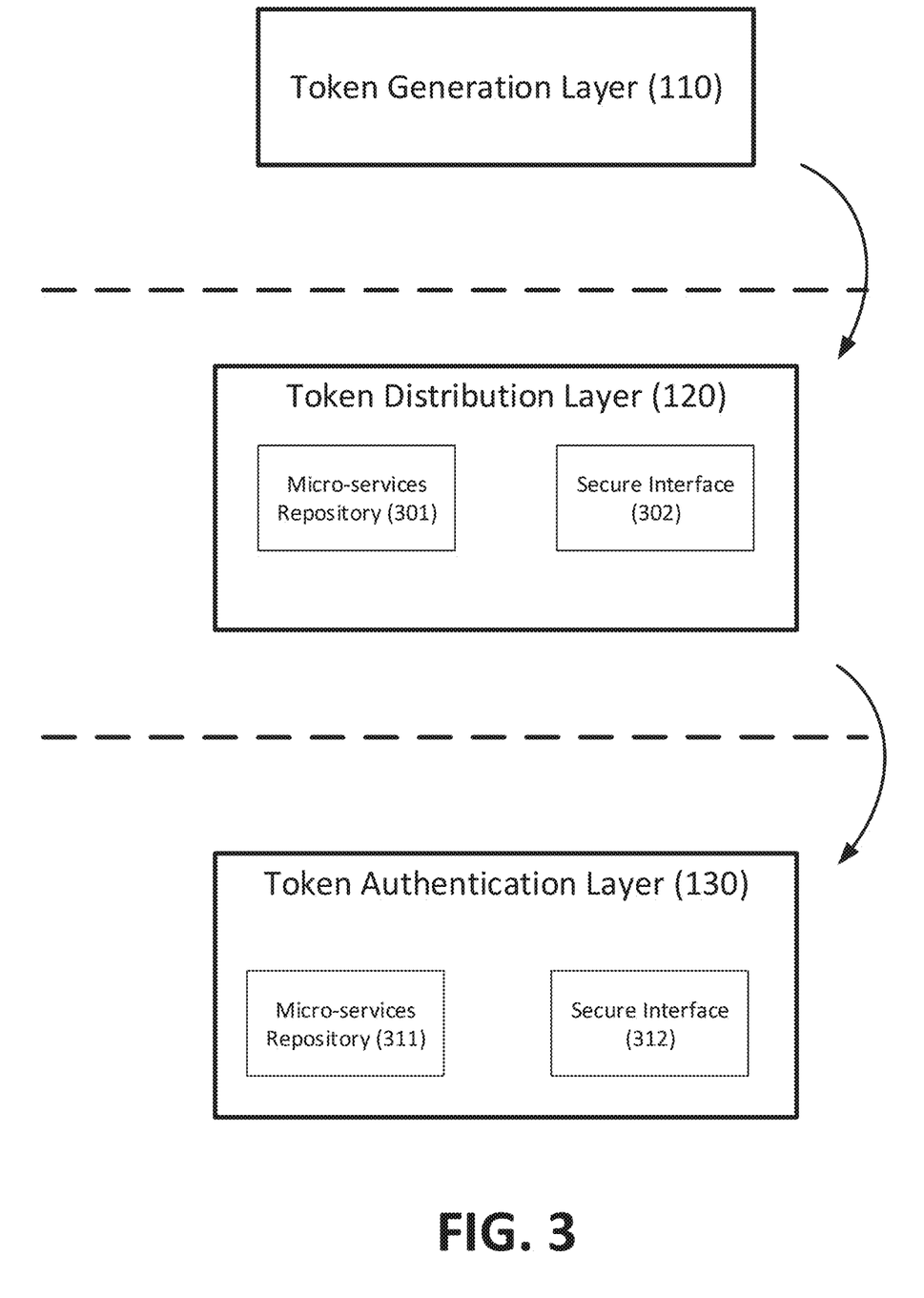
FIG. 3 shows an example agnostic authentication system including an orchestration layer.

FIG. 3 shows an example agnostic authentication system including an orchestration layer. Modern software architecture can be either monolithic or distributed. In a monolithic architecture, a single application performs all the required functions. However, in a distributed architecture, there can be an abstraction layer which leverages and integrates independent APIs. Unlike the monolithic architecture, the distributed architecture calls for external APIs for various tasks, and through code, it makes specific requests. In response, these APIs perform the task delegated to them and return outputs.

In this example embodiment, the token distribution layer 120 and the token authentication layer 130 each can include a microservices repository (i.e., microservices repository 301 and microservices repository 311) and a secure interface (i.e., secure interface 302 and secure interface 312).

The microservices repository can host the relationship between each layer and the external layer with which it communicates. For example, the microservices repository 301 can host the relationship between the token distribution layer 120 and the token generation layer 110. As another example, the microservices repository 311 can host the relationship between the token distribution layer 120 and the token authentication layer 130.

The secure interface can be an edge layer between each layer and an outside layer. The secure interface can enhance the security of access to the layer. For example, a security interface can prevent denial-of-service attacks. As another example, a security interface can prevent excessive log-ins or too many attempts at entering a password for a given username. A security interface can prevent brute force attacks.

Figure 4:
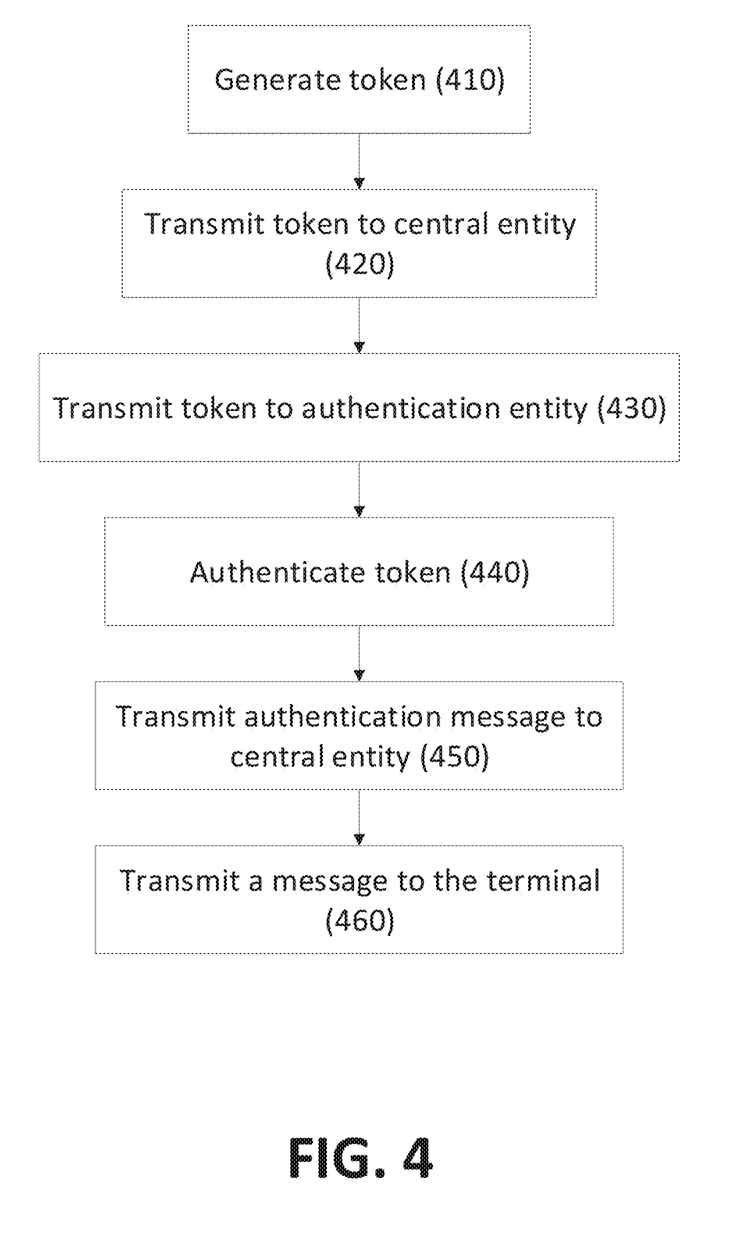
FIG. 4 shows an example flow chart according to an example embodiment.

FIG. 4 shows an example flow chart 400 according to an example embodiment. In step 410, a terminal can generate a token. In step 420, the terminal can transmit the token to the central entity. In step 430, the central entity can decide to transmit the token to an authentication entity. In step 440, the authentication entity can verify or authenticate the token. In step 450, the authentication entity can transmit an authentication message to the central entity. Based on the authentication message, in step 460, the central entity can transmit a message to the terminal indicating that the authentication entity authenticated or verified the user and/or a request associated with the user.

Figure 5:
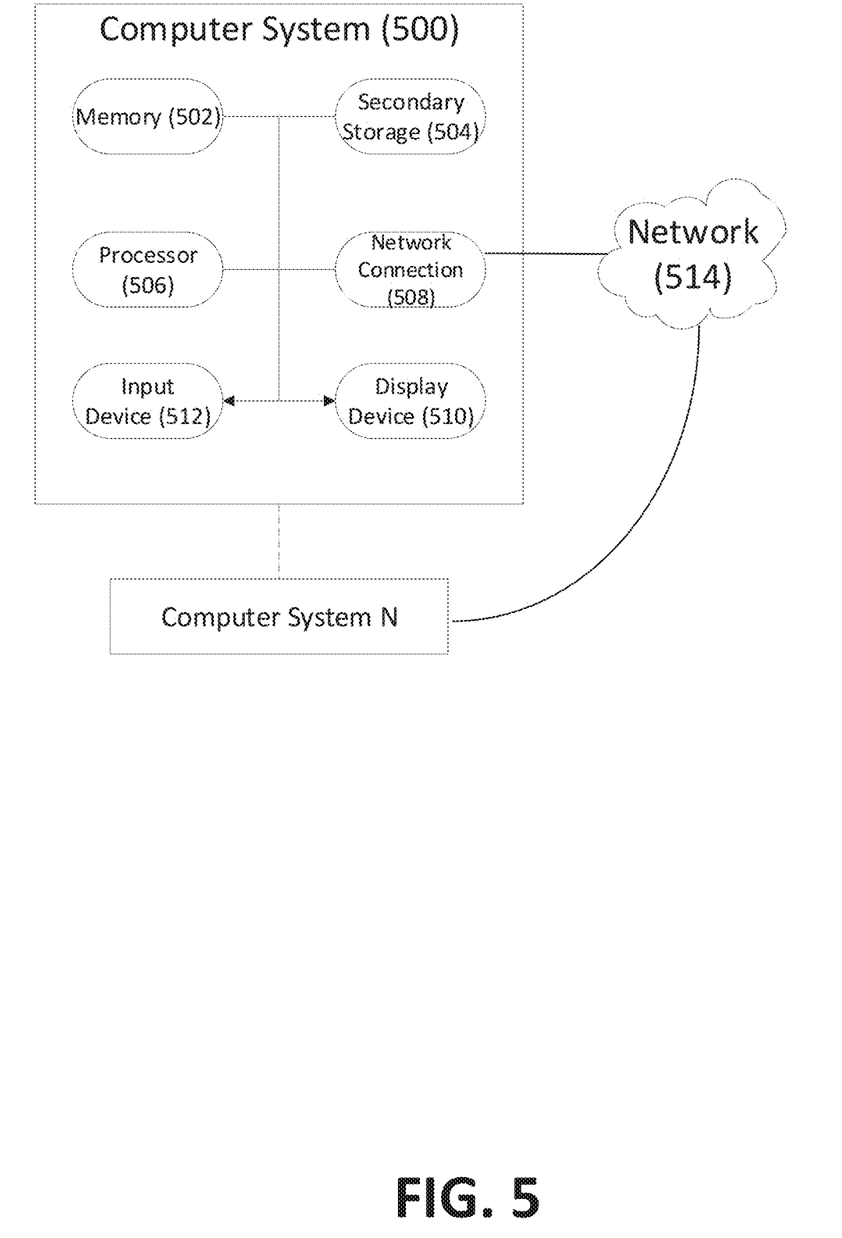
FIG. 5 illustrates exemplary hardware components for a server.

FIG. 5 illustrates exemplary hardware components of a server (which can be included in the central entity or any of the authentication entities). A computer system 500, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 500, may run an application (or software) and perform the steps and functionalities described above. Computer system 500 may connect to a network 514, e.g., Internet, or other network, to receive inquiries, obtain data, and transmit information and incentives as described above.

The computer system 500 typically includes a memory 502, a secondary storage device 504, and a processor 506. The computer system 500 may also include a plurality of processors 506 and be configured as a plurality of, e.g., bladed servers, or other known server configurations. The computer system 500 may also include a network connection device 508, a display device 510, and an input device 512.

The memory 502 may include RAM or similar types of memory, and it may store one or more applications for execution by processor 506. Secondary storage device 504 may include a hard disk drive, floppy disk drive, CD-ROM drive, or other types of non-volatile data storage. Processor 506 executes the application(s), such as those described herein, which are stored in memory 502 or secondary storage 504, or received from the Internet or other network 514. The processing by processor 506 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 500 may store one or more database structures in the secondary storage 504, for example, for storing and maintaining the information necessary to perform the above-described functions. Alternatively, such information may be in storage devices separate from these components.

Also, as noted, processor 506 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 500.

The input device 512 may include any device for entering information into the computer system 500, such as a touchscreen, keyboard, mouse, cursor-control device, microphone, digital camera, video recorder or camcorder. The input and output device 512 may be used to enter information into GUIs during performance of the methods described above. The display device 510 may include any type of device for presenting visual information such as, for example, a computer monitor or flat-screen display (or mobile device screen). The display device 510 may display the GUIs and/or output from sub-system components (or software).

Examples of the computer system 500 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 500 is shown in detail, system 500 may use multiple computer systems or servers as necessary or desired to support the users and may also use back-up or redundant servers to prevent network downtime in the event of a failure of a particular server. In addition, although computer system 500 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 500, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:
maintaining, at a server, a database identifying a plurality of authentication entities and a required communication protocol in association with each one of the plurality of authentication entities;
receiving at the server a first token from a terminal, wherein the first token is associated with a client device and the terminal transmitted the first token to the server in association with an authentication operation;
analyzing, at the server, the first token to determine a subset of the plurality of authentication entities to contact;
generating a plurality of tokens, wherein each token meets the required communication protocol for at least one of the subset of the plurality of authentication entities;
transmitting the plurality of tokens to the subset of the plurality of authentication entities, wherein each token is transmitted to only one of the subset of the plurality of authentication entities;
receiving, at the server, an authentication entity message from each of the subset of the plurality of authentication entities; and
transmitting, from the server to the terminal, a terminal message based on at least one of the authentication entity messages, wherein the terminal message is at least one of an approval or a rejection of the authentication operation.

2. The method of claim 1, wherein the first token masks information about the client device and the terminal.

3. The method of claim 1, wherein the first token includes an instruction to determine the subset of the plurality of authentication entities.

4. The method of claim 3, wherein the instruction was received at the terminal or the client device.

5. The method of claim 1, wherein:
the server is configured to receive a communication from the client device;
the communication includes at least one rule; and
the server is configured to determine the subset of the plurality of authentication entities based on the at least one rule.

6. The method of claim 5, wherein the rule defines a ranking for the plurality of authentication entities.

7. The method of claim 5, wherein the rule excludes at least one of the plurality of authentication entities.

8. The method of claim 1, wherein:
the server includes a predictive model; and
the predictive model is configured to determine the subset of the plurality of authentication entities.

9. The method of claim 8, wherein the predictive model is machine learning model which was trained using past authentication operation data.

10. The method of claim 9, wherein past authentication operation data includes data points for past authentication operations and authentication entities that were contacted for each past authentication operation.

11. The method of claim 1, further comprising:
in response to receiving at least one rejection authentication entity message from one of the subset of the plurality of authentication entities, transmitting a plurality of follow up tokens to a second subset of the plurality of authentication entities.

12. The method of claim 11, wherein a predictive model stored on the server is configured to determine the second subset of the plurality of authentication entities.

13. The method of claim 11, wherein the subset of the plurality of authentication entities is different from the second subset of the plurality of authentication entities.

14. A method comprising:
syncing a client device with a terminal;
generating a first token at the client device and transmitting the first token to the terminal, wherein:
the first token is associated with the client device and the terminal is configured to transmit the first token to a server to request an authentication operation;
the server maintains a database identifying a plurality of authentication entities and a required communication protocol in association with each one of the plurality of authentication entities;
the server is configured to analyze the first token to determine a subset of the plurality of authentication entities to contact;
the server is configured to generate a plurality of tokens, wherein each token meets the required communication protocol for at least one of the subset of the plurality of authentication entities;
the server transmits the plurality of tokens to the subset of the plurality of authentication entities, wherein each token is transmitted to only one of the subset of the plurality of authentication entities; and
the server is configured to receive an authentication entity message from each of the subset of the plurality of authentication entities; and
receiving, from the terminal at the client device, a terminal message based on at least one of the authentication entity messages, wherein the terminal message is at least one of an approval or a rejection of the authentication operation.

15. The method of claim 14, wherein the first token masks information about the client device and the terminal.

16. The method of claim 14, wherein the first token includes an instruction to determine the subset of the plurality of authentication entities.

17. The method of claim 16, wherein the instruction was received at the client device.

18. The method of claim 14, wherein:
the server is configured to receive a communication from the client device;
the communication includes at least one rule; and
the server is configured to determine the subset of the plurality of authentication entities based on the at least one rule.

19. The method of claim 18, wherein the rule defines a ranking for the plurality of authentication entities.

20. The method of claim 18, wherein the rule excludes at least one of the plurality of authentication entities.

* * * * *